US007720699B2

(12) United States Patent
Santoloci

(10) Patent No.: US 7,720,699 B2
(45) Date of Patent: May 18, 2010

(54) CRITICAL INJURY INSURANCE SYSTEMS AND METHODS

(75) Inventor: John L. Santoloci, Loveladies, NJ (US)

(73) Assignees: Employers Reinsurance Corporation, Overland Park, KS (US); Metropolitan Life Insurance Company of New York, New York, NY (US)

( * ) Notice: Subject to any disclaimer, the term of this patent is extended or adjusted under 35 U.S.C. 154(b) by 1328 days.

(21) Appl. No.: 10/127,650

(22) Filed: Apr. 22, 2002

(65) Prior Publication Data

US 2003/0200121 A1 Oct. 23, 2003

(51) Int. Cl.
*G06Q 40/00* (2006.01)

(52) U.S. Cl. .............................................. 705/4; 705/3

(58) Field of Classification Search ...................... 705/4, 705/35, 37, 3, 2, 36 R, 80, 1, 30, 38; 709/206, 709/229; 726/1, 13, 22, 3; 600/300
See application file for complete search history.

(56) References Cited

U.S. PATENT DOCUMENTS

| | | | | | |
|---|---|---|---|---|---|
| 4,347,568 | A | * | 8/1982 | Giguere et al. .............. | 600/300 |
| 4,752,877 | A | * | 6/1988 | Roberts et al. ............ | 705/36 R |
| 4,975,840 | A | * | 12/1990 | DeTore et al. ................. | 705/4 |
| 5,692,501 | A | * | 12/1997 | Minturn ....................... | 600/301 |
| 5,712,984 | A | * | 1/1998 | Hammond et al. ............. | 705/4 |
| 5,752,236 | A | * | 5/1998 | Sexton et al. .................... | 705/4 |
| 5,926,800 | A | * | 7/1999 | Baronowski et al. .......... | 705/35 |
| 6,393,405 | B1 | * | 5/2002 | Vicente ......................... | 705/4 |
| 6,456,979 | B1 | * | 9/2002 | Flagg ............................. | 705/4 |
| 6,584,446 | B1 | * | 6/2003 | Buchanan et al. .............. | 705/4 |
| 6,604,080 | B1 | * | 8/2003 | Kern .............................. | 705/4 |
| 2001/0041993 | A1 | * | 11/2001 | Campbell ...................... | 705/4 |
| 2002/0029157 | A1 | * | 3/2002 | Marchosky .................... | 705/3 |
| 2002/0077867 | A1 | * | 6/2002 | Gittins et al. .................. | 705/4 |
| 2002/0091613 | A1 | * | 7/2002 | Kendall et al. ................ | 705/37 |

(Continued)

OTHER PUBLICATIONS

Colditz, et al., Harvard Report on Cancer Prevention. vol. 4: Harvard Cancer Risk Index. Cancer Causes and Control 11: 477-488, 2000. [Retrieved from Internet Sep. 26, 2006]. URL: <http://www.hsph.harvard.edu/cancer/resources_materials/reports/pdfs/HCCP_report_on_cancer_prev_vol4.pdf>.*

(Continued)

*Primary Examiner*—Gerald J. O'Connor
*Assistant Examiner*—Natalie A Pass
(74) *Attorney, Agent, or Firm*—Armstrong Teasdale LLP

(57) ABSTRACT

Systems and methods for use in settling mass tort claims are disclosed for determining insurance premiums for asymptomatic claimants in order to provide an insured defined monetary benefit in the event of a future emergence of critical injuries associated with exposure to injurious substances or conditions. Asymptomatic claimant risk classification data are entered for each settling claimant. Mortality and critical injury tables are determined. Durational probabilities of surviving without emergence of a covered critical injury are determined from a present date for each future insurance coverage year during the remaining life of the settling claimant. The durational probabilities are multiplied by the critical injury rates and then multiplied by the amounts of the specified monetary benefits. The premiums are then determined for a single claimant and on an aggregate basis for all claimants in any particular batch of mass tort claims settlements.

30 Claims, 5 Drawing Sheets

U.S. PATENT DOCUMENTS

| | | | |
|---|---|---|---|
| 2002/0103679 A1* | 8/2002 | Burkhalter et al. ............. | 705/4 |
| 2003/0093304 A1* | 5/2003 | Keller et al. .................... | 705/4 |
| 2003/0191672 A1* | 10/2003 | Kendall et al. ................. | 705/4 |
| 2005/0060209 A1* | 3/2005 | Hill et al. ....................... | 705/4 |
| 2005/0080653 A1* | 4/2005 | Stemple ......................... | 705/4 |

OTHER PUBLICATIONS

Anderson, D., Financing Asbestos Claims: Coverage Issues, Manville's Bankruptcy and the Claims Facility. The Journal of Risk and Insurance, vol. 54, No. 3. (Sep. 1987), pp. 429-451. [Retrieved from Internet Aug. 5, 2008] URL: <http://www.jstor.org/stable/pdfplus/253361.pdf>.*

Danzon. P.M. Compensation for Occupational Disease: Evaluating the Options. The Journal of Risk and Insurance, vol. 54, No. 2 (Jun. 1987), pp. 263-282.[Retrieved from Internet Aug. 5, 2008] URL: <http://www.jstor.org/stable/pdfplus/252857.pdf>.*

* cited by examiner

CRITICAL INJURY INSURANCE SYSTEMS AND METHODS

BACKGROUND OF THE INVENTION

Mass tort litigation typically involves large numbers of similar tort claims made by claimants (variously, "claimants" and "plaintiffs") against corporations (variously, "potentially responsible parties" or "defendants") that may be legally responsible for bodily injuries resulting from exposures to injurious conditions or substances.

In order to maintain a tort claim, each claimant must show some evidence of present bodily injury that the claimant attributes to that exposure. The evidence of present bodily injury may range from slight to serious, including symptoms of life threatening conditions associated with the injurious exposure.

Claimants who have already manifested symptoms of serious bodily injury may have a basis for substantial damages, including consideration of further bodily injury that is reasonably certain to emerge in the future. Those claimants who have manifested only slight bodily injury would generally be entitled to less substantial damages. Neither symptomatic nor asymptomatic claimants would generally be entitled to current damages awards or settlements for future injury that is not then reasonably certain to occur.

A potentially responsible party may or may not have liability insurance under which an insurer is contractually obligated to provide a defense against bodily injury tort claims and to pay any damages awards or settlements within its insurance coverage.

Settlements are complicated by the substantial risk of a later emergence of serious bodily injury, for example cancer, associated with the injurious exposure that was not evident at the settlement. Neither tort claimants nor the potentially responsible parties can then know with certainty whether or which of the claimants will later manifest more serious bodily injuries associated with that injurious exposure. By way of example, any claimants in mass tort litigation involving asbestos who present clinical evidence of injurious exposure and who are currently asymptomatic as to mesothelioma, lung cancer or other cancers that are associated with asbestos may later develop one or more of these critical injuries ("critical injuries") and some of them are likely to do so.

Asymptomatic claimants who have been exposed to an injurious condition or substance and the potentially responsible parties and their liability insurers may wish to settle these claims. They do not, however, have an efficient mechanism for settling claims that have the risk of a future critical injury emergence. In some instances, the lack of this mechanism results in partial settlements in which claimants may, in the future, present additional claims upon later critical injury emergence.

The invention seeks to advance the state of the art for quantifying the risk of the later critical injuries emergence for claimants who currently present evidence of injurious exposure but who are asymptomatic as to the more serious or life threatening bodily injuries that are associated with the injurious exposure. Other features of the invention are apparent in the description that follows.

SUMMARY OF THE INVENTION

The invention provides, in certain aspects, systems and methods for quantifying the risk of later critical injuries emergence among large numbers of claimants who have been exposed to an injurious substance or condition. In other aspects, these systems and methods facilitate arrangements for guaranteed payments of defined monetary benefits upon later critical injury emergence. These payments may be set forth in an insurance policy ("critical injury insurance") defining the monetary benefits to asymptomatic settling claimants.

In one aspect, actuarial evaluation and quantification produces a present value for the risk of future critical injury emergence among asymptomatic claimants who may have been exposed to injurious substances or conditions. The present value may be used to facilitate settlement of mass tort claims associated with the injurious exposure.

In one aspect, the invention provides a computerized process to determine premiums for the risk that an asymptomatic exposed claimant will later manifest symptoms leading to a diagnosis of a critical injury. This computerized process may facilitate the systems and methods described above.

In one aspect, these premium calculations functionally depend upon the length and type of risk exposure to the injurious substances or conditions. In another aspect, these premium calculations further depend upon specific factors and individual characteristics of the asymptomatic exposed claimant. With regard to asbestos exposure, these factors may include, for example, age, sex, status as smoker or non-smoker, duration of exposure, severity of exposure and/or other factors associated with critical injuries.

In yet other aspects, the computerized process synthesizes actuarial methodology, risk classification data, underwriting standards and/or administrative protocols for determining the critical injury insurance premiums.

In still another aspect, the process is scaleable so that mass tort claimants and potentially responsible parties are provided objective information about current costs for any number of critical injuries settlements at various projected benefit levels. The immediate availability of this information for dealing with potential future critical injuries emergence may, for example, be advantageous in negotiating mass tort claims settlements.

An insurer, utilizing the invention, may, for example, offer insurance policies to defendants and additional insured certificates to claimants that provide specified monetary benefits upon later critical injury diagnosis. Accordingly, cash settlement proceeds in tort claim settlements may be distributed to the claimants who are already symptomatic while the insurance product protects, in the event of future critical injury emergence, those claimants who are asymptomatic at settlement. This mechanism substitutes the financial security of the insurance policy in place of the possibility of a future tort claim, thereby reducing the problems and uncertainties associated with determining future liability and recoveries.

In another aspect, the invention provides a method for determining insurance premiums for defined monetary benefits payable to one or more asymptomatic claimants upon future emergence of at least one critical injury, including the steps of: entering asymptomatic claimant risk classification data for the claimants; determining a mortality table based on the data; determining mortality rates from the mortality table; determining a critical injury table based on the data; determining critical injury incidence rates from the critical injury table; determining first durational probabilities of surviving without emergence of the critical injury from a present date to each future insurance coverage year end; multiplying the first durational probabilities by the critical injury incidence rates to determine second durational probabilities of critical injury emergence in future insurance coverage years; multiplying the defined monetary benefits by the second durational probabilities to determine expected payments of the defined monetary benefits; and discounting the expected payments for interest to determine net insurance cost on a present value basis. These steps may be repeated and/or aggregated for multiple asymptomatic claimants. In one aspect, the step of entering asymptomatic data includes electronically processing batched information including data for each of the claimants. The batched information may be electronically sorted as a budgetary control procedure to determine whether additional claimants should be processed.

The method steps described herein may be electronically processed and/or automated through computer processors, software and the like, and in accord with the teachings herein as a matter of design choice. By way of example, starting with the entering asymptomatic claimant risk classification data, the method steps may be electronically processed sequentially or in batches of asymptomatic claimants through a computerized database and network.

The step of entering the asymptomatic claimant risk classification data may include the step of entering asbestos data such as age, sex, smoker non-smoker status, duration of exposure, and severity.

The step of determining a mortality table may include the step of selecting a standard mortality table. The mortality table may be modified, in another aspect, based on unique characteristics in the data.

The step of determining a critical injury table may include the step of selecting a standard critical injury table. The critical injury table may be modified, in another aspect, based on unique characteristics in the data.

In another aspect, the method includes the step of converting the net insurance cost to insurance premiums. The method may include the further step of loading one of both of future administrative costs and risk allowance to the insurance premiums to produce loaded single claimant premiums. The method may also include the step of aggregating the loaded single claimant premiums for all of the claimants to determine a total premium price.

In one aspect, the step of determining first durational probabilities includes modifying the single claimant premiums for multiple covered critical injuries.

In another aspect, current capital market rates are used to select discount interest rates at each duration of insurance coverage.

The invention may also provide a system for determining insurance premiums setting forth a monetary benefit for asymptomatic plaintiffs. A computerized database stores actuarial statistical information, insurance risk information and asymptomatic claimant risk classification data. The computerized database has a processor for processing the actuarial statistical information and insurance risk information with the claimant risk classification data to determine the premiums.

In one aspect, the system has means for producing an insurance product setting forth critical injury insurance for the monetary benefit. The system may further be configured with means for producing an insurance product such as an insurance certificate.

In another aspect, the system includes a network connection for connecting the computerized database with a remote computer. The remote computer may be configured to download batched information including the asymptomatic claimant risk classification data for each of the claimants.

In one aspect, the computerized database is configured to determine a mortality table based on the asymptomatic claimant risk classification data. Means may be included to modify the mortality table based on unique characteristics of the asymptomatic claimant risk classification data.

In another aspect, the computerized database is configured to determine one or more critical injury tables based on the asymptomatic claimant risk classification data. The computerized database may also be configured to determine critical injury rates using single-decrement tables and/or to determine durational probabilities of surviving without emergence of a critical injury from the present date to each future year end of insurance coverage.

In another aspect, the computerized database is configured to multiply durational probabilities with critical injury incidence rates to determine a durational probability of emergence in each future insurance coverage year. The computerized database may be further configured to multiply the monetary benefit with the durational probabilities.

The invention is next described further in connection with certain embodiments. Various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
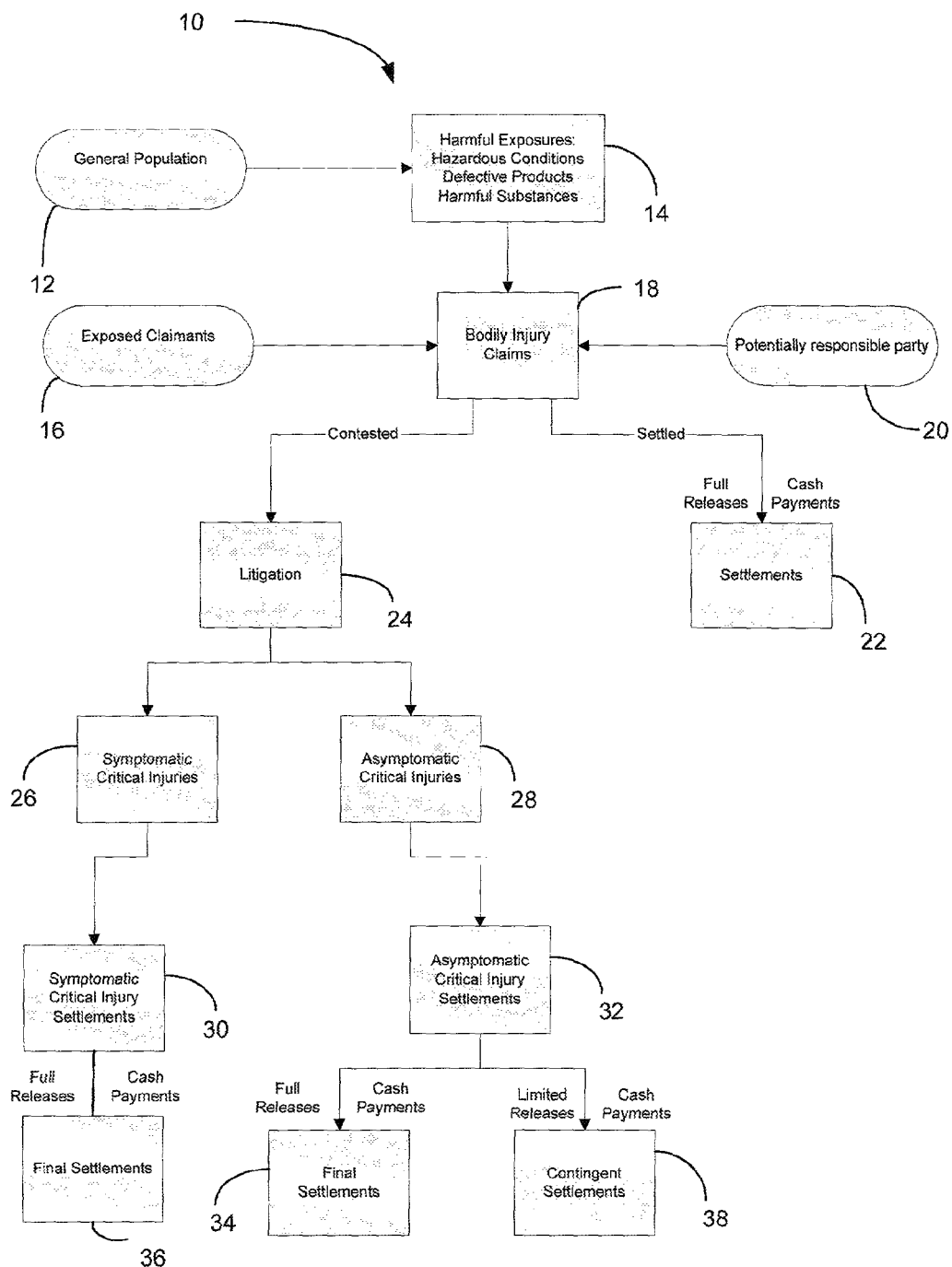
FIG. 1 illustrates a typical exposure-to-settlement process of prior art mass tort claims settlements.

FIG. 1 shows an exposure-to-settlement process 10 of a prior art mass tort litigation. In process 10, the general population 12 may potentially be exposed to one or more hazardous conditions and injurious substances (collectively, "injurious exposures" 14) such as within the workplace. The combination of the general population 12 with injurious exposures 14 may result in a large number of exposed claimants 16 generating a large number of individual bodily injury claims 18 for submission to a potentially responsible party 20, for example a corporation, or to a liability insurer that is contractually obligated to defend and indemnify the potentially responsible party 20 for legal liabilities associated with injurious exposures 14.

Claims 18 may result in settlements 22, whereby full and final releases and payments are made, such as by and on behalf of potentially responsible party 20. On the other hand claims 18 may be contested in litigation. In the latter case, and for either settlements or for litigated claims, claimants 16 may be categorized in two ways: (1) as claimants who have symptoms of critical injuries 26 (i.e., those claimants with symptoms associated with injurious exposures 14), or (2) as claimants who are asymptomatic as to critical injuries 28 (i.e., those claimants without symptoms but who have had alleged or actual injurious exposures 14).

In the case of symptomatic claimants with critical injuries 26, litigation 24 may result in claimants critical injury settlements 30, in which full and final releases and cash payments are made by a potentially responsible party 20 as final settlements 36. In the case of claimants with asymptomatic injuries 28, however, litigation 24 may result in claims settlements 32 leading to either (a) final settlements 34, with full releases in exchange for cash payments, or (b) contingent settlements 38, with limited releases for cash payments and possible new claims if critical injuries subsequently emerge.

Figure 2:
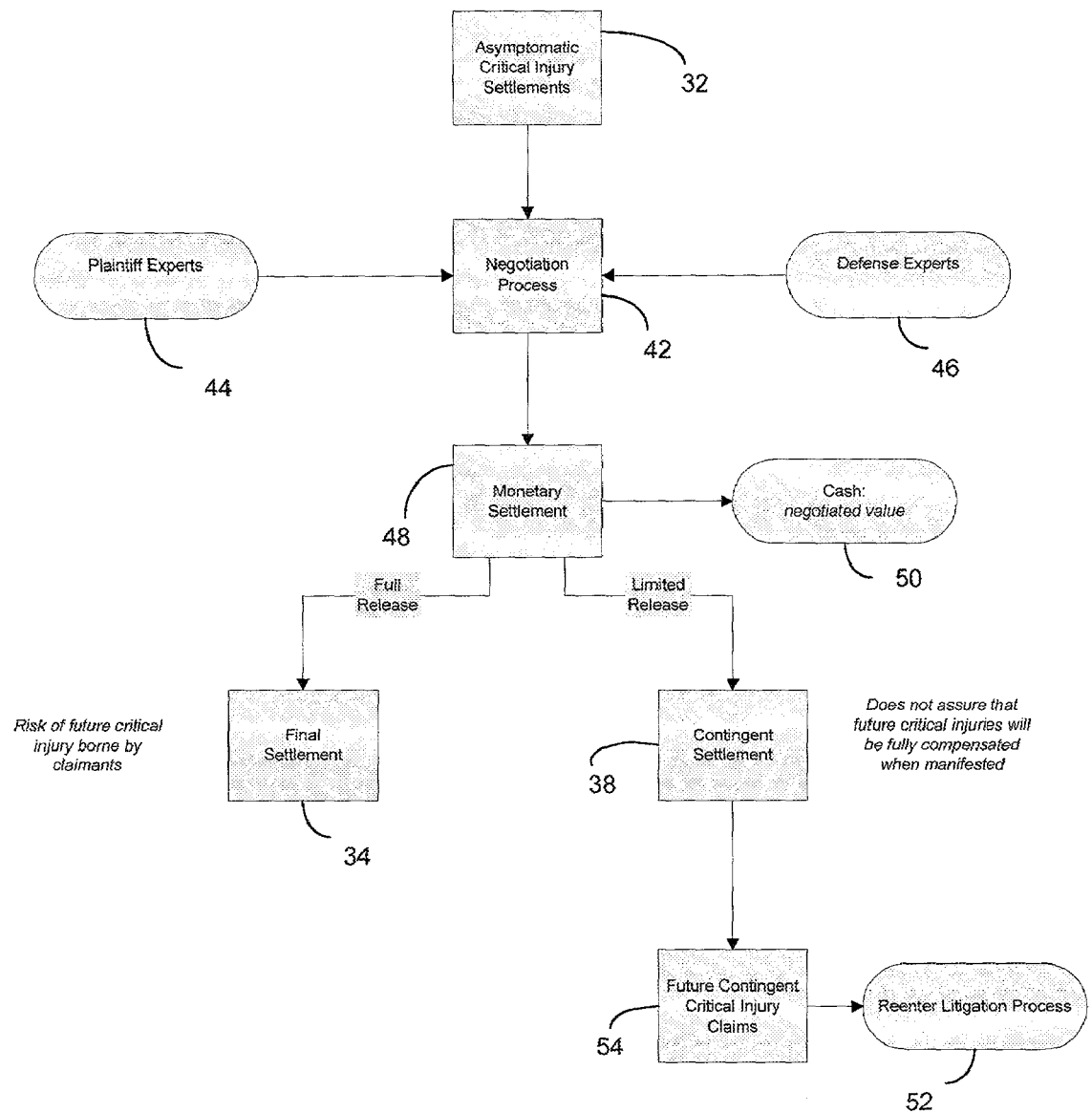
FIG. 2 illustrates further detail of the asymptomatic critical injury settlement process in the process of FIG. 1.

FIG. 2 shows further detail of process 10 starting with critical injury settlements 32 with asymptomatic claimants. That settlement process 32 may include a negotiation process 42 featuring plaintiff experts 44 and defense experts 46. The negotiation process 42 then may result in a monetary settlement 48 upon a general release in exchange for a cash payment 50 at negotiated values determined by process 42.

Settlement 48 may have one of two outcomes. In one outcome, settlement 48 may include a full release with a final settlement 34. In final settlement 34 the risk of emergence of future critical injuries is borne by settling asymptomatic claimants 28. In the second outcome, final settlement 48 includes a contingent settlement 38. Contingent settlement 38 does not, however, assure that settling asymptomatic claimants 28 will, in fact, be able, in the future, to obtain additional settlements or awards of damages in the event of future manifestation of other critical injuries associated with injurious exposures 14; rather, contingent settlement 38 merely permits claimants to re-enter the litigation process 52 by submission of future critical injury claims 54 at the point of manifestation, if ever occurring. In short, claimants settling via outcome to contingent settlement 38 have reserved their rights in case of actual future manifestation of critical injuries; those reserved rights include the right to litigate actual critical injuries much like claimants 26 of FIG. 1.

The main difficulty with process 10 shown and described in FIG. 1 and FIG. 2 is that asymptomatic plaintiffs 28 and potentially responsible party 20 do not have mechanisms for consistent treatment of claims. Litigation 24 and settlements 34, 36 and 38 do not provide a rational assessment of liability or outcome to any party. This uncertainty can result in future litigation, inconsistent settlements and higher administrative costs for potentially responsible party 20.

Figure 3:
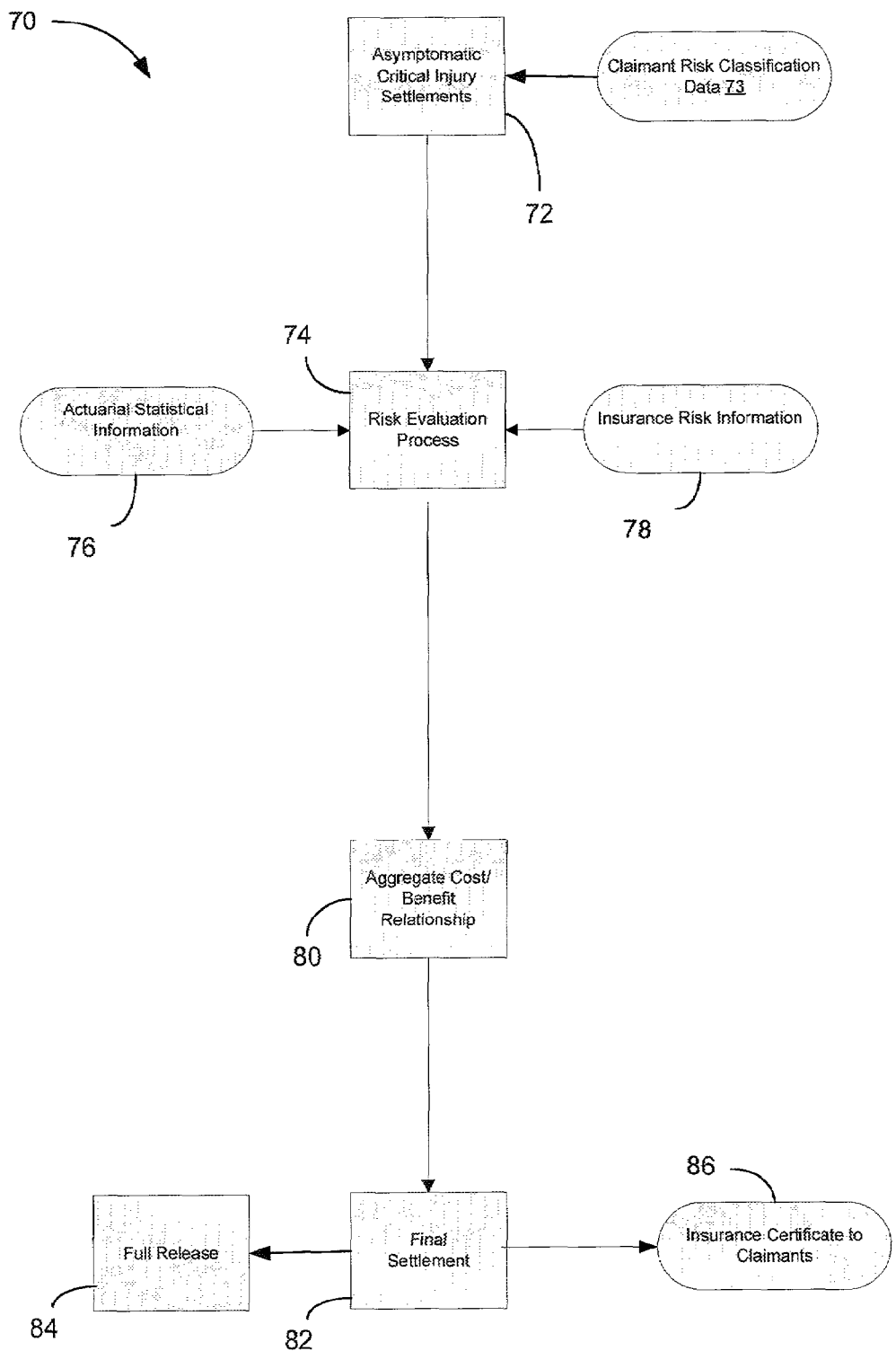
FIG. 3 shows one asymptomatic critical injury settlement process in accord with the invention.

In one process, shown in FIG. 3, the invention overcomes the limitations and difficulties of the prior art by objective quantification of the outcome risk value for asymptomatic claimants 28. Unlike the asymptomatic critical injury settlement process 32 of FIG. 2, process 70 of FIG. 3 begins by performing a risk evaluation process 74, using critical injury risk classification data 73 and inputs from actuarial statistical information 76 and insurance risk information 78. Risk evaluation process 74 determines a precise and objective present value of the critical injury costs for insuring an asymptomatic claimant 28, providing a defined monetary benefit.

This cost is aggregated for all asymptomatic claimants 28 to arrive at an aggregate cost/benefit relationship 80. A final settlement 82 is effectuated by entry into a full release 84 by asymptomatic claimants 28 in exchange for issuance 86 of an insurance certificate for asymptomatic claimants 28. Process 70 thus terminates mass tort claims in final settlements 82 with defined insured benefits assured for asymptomatic claimants 28 upon any subsequent critical injury emergence from exposures 14, FIG. 1.

As described in more detail below in connection with FIG. 4 and FIG. 5, process 70 generally involves software calculations and computerized data synthesis to determine the present value cost for agreed benefit amounts and/or other settlement information for each critical injury covered at determinable total premiums for any of the settling mass tort claimants. The terms of final settlements 82, as negotiated by a potentially responsible party 20 FIG. 1 and asymptomatic claimants 28, specify the amount of insured critical injury benefits. Process 70 thus provides fast and accurate calculations of premiums for any agreed benefit levels and any number of settling claimants in final settlement 82.

Figure 4:
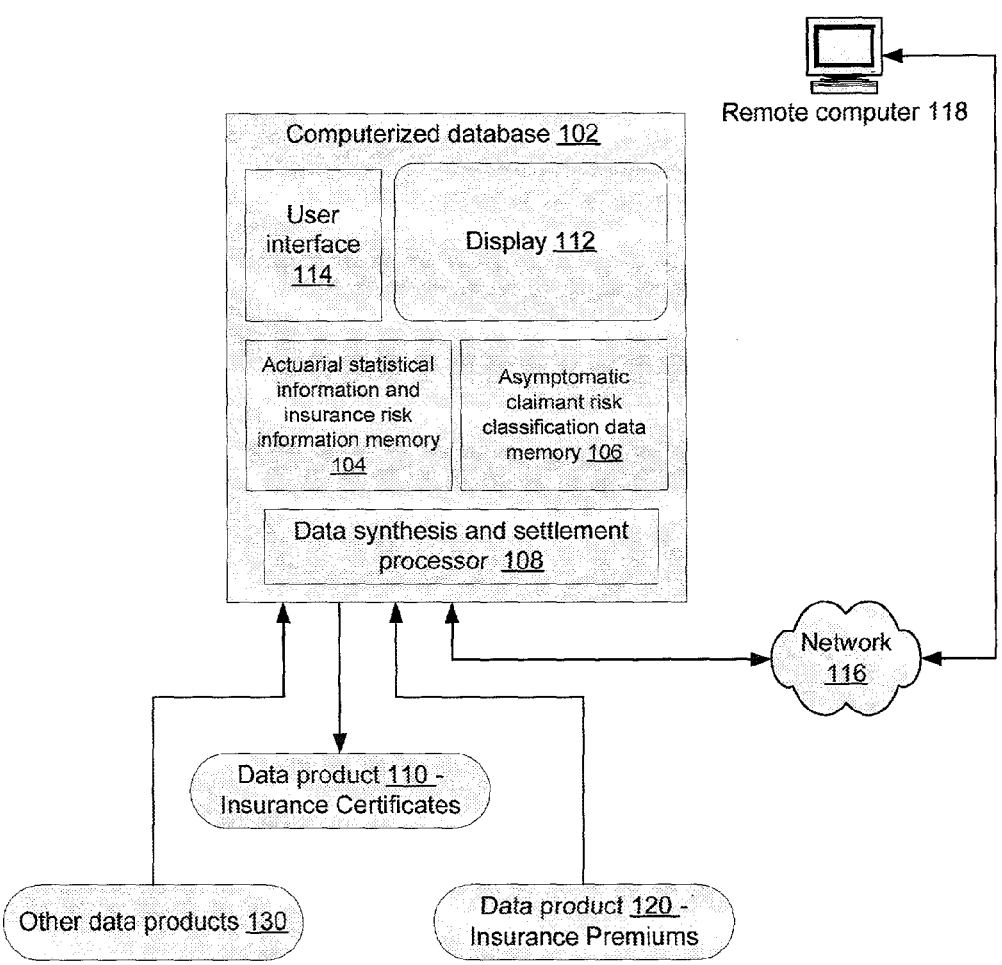
FIG. 4 is a schematic view of one computerized system of the invention.

FIG. 4 shows a system 100 constructed according to the invention. System 100 includes a computerized database 102 with internal memory 104, internal memory 106, and data processor 108. Internal memory 104 stores actuarial statistical information and insurance risk information for system 100; actuarial statistical information and insurance risk information may, for example, include actuarial statistical information 76, such as mortality tables, and insurance risk information 78, such as underwriting and claims protocols, as shown in FIG. 3.

Internal memory 106 stores asymptomatic claimant risk classification data for system 100; with regard to asbestos exposure, for example, asymptomatic claimant risk classification data may include rating information factors—such as age, sex, status as smoker or non-smoker, duration of exposure, severity of exposure, and/or other factors that are associated with the emergence of the critical injuries 28 for each mass tort asymptomatic claimant.

Processor 108 synthesizes and/or processes information and risk classification data from memories 104, 106 such that system 100 determines cost/benefit relationships 80, FIG. 3, for the asymptomatic exposed claimants. Computerized database 102 may, for example, produce a data product 110 in the form of an insurance certificate setting forth the benefits and amounts to be paid to each settling claimant in the event of later critical injury emergence. Computerized database 102 may further, for example, produce a data product 120 in the form of insurance premiums setting forth the premiums payable by responsible party 20, FIG. 1. A user of computerized database 102 may review reports of synthesized data at a local display 112 as a matter of design choice. Those skilled in the art should appreciate that computerized database 102 may produce other data products 130 supporting the features, calculations and teachings of the invention as described herein, as a matter of design choice.

Information for memory 104, 106 may be manually entered at a user interface 114 (e.g., a keyboard), or remotely downloaded to computerized database 102 via connection with a network 116, as shown. A remote computer 118 connected to network 116 may be used to download the information; it may alternatively be used to operate and remotely view results and calculations at computerized database 102, such as information representing data products 110, 120, 130. Information downloaded to computerized database 102 may include "batched" information and electronic forms setting forth rating information factors for each asymptomatic claimant 28.

Those skilled in the art should appreciate that the architecture of system 100 is illustrative and that changes may be made without departing from the scope of the invention. By way of example, a common memory, CD ROM and/or hard drive may store actuarial statistical information, insurance risk information, and asymptomatic claimant risk classification data as a matter of design choice.

With further regard to FIG. 3 and FIG. 4, process 70 and system 100 enable an insurer to develop claimant rates quickly and accurately for several or many asymptomatic claimants setting forth the benefits covering critical injuries as provided in final settlement 82. Upon payment of premiums 120, for example, the insurer issues a policy to the settling defendant and also issues insurance certificates 110 to each settling claimant that state the critical injury benefit amounts to be paid to each in the event of a subsequent critical injury emergence.

In the context of mass tort litigation, therefore, issuance 86 of insurance certificates 110 may, for example, be issued in accordance with a policy previously issued to a settling defendant in contemplation of a final settlement 82. After being individually rated by the insurer, and upon payment of a premium by the defendant, insurance certificates will be issued 86 separately to each settling asymptomatic plaintiff.

Settlement agreements 82 are negotiated in batches between plaintiffs' counsel and counsel for each potentially responsible party 20. These plaintiffs may provide specified risk classification data (e.g., for asbestos exposure, duration and severity of exposure, age, sex and smoker status); this information may, for example, be input to system 100 via network 116 and used to develop premiums 120.

Advantages are thus realized by various features of the invention as described herein, particularly in large mass tort claims settlements involving exposure to asbestos or other cancer-causing substances. In accord with the teachings of the invention, a plaintiff's entry into a final settlement 82 with the policy-holding defendant results in issuance 86 of an insurance certificate 110 to each settling asymptomatic plaintiff.

The issuance 86 of the insurance certificate 110 thus removes from the mass tort settlement process uncertainty for asymptomatic plaintiffs 28 and potentially liable party 20 with respect to legal liability on account of future emergence of covered critical injuries.

Once the policy is issued to the defendant, it may settle claims with plaintiffs with certainty that the insurer will provide coverage for plaintiffs who meet objective eligibility criteria and/or who do not meet those objective criteria on a special acceptance basis. If and when the covered asymptomatic plaintiff develops a covered critical injury, such as a defined cancer, the plaintiff files a claim with the insurer for the insured benefit based on a qualified physician's covered critical injury diagnosis without further proof of causation attributed to the injurious exposure. Subject to claim verification, the insurer pays the benefit as provided in the insurance certificate.

System 100, FIG. 4, may utilize software to process the claimant risk classification data used in pricing critical injury benefits. System 100 may be further updated for the addition of critical injuries whenever the insurer develops rating data sufficient to produce rates for the additional coverages on an actuarial basis, for storage in memory 104.

System 100 enables the insurer to develop actuarially appropriate premium rates for batches of claims settlements so that an insured defendant may budget for and obtain releases from large numbers of settling asymptomatic plaintiffs at predictable costs. System 100 further assists in the negotiations between asymptomatic plaintiffs and a defendant by providing a "neutral" data product 110 setting forth the cost of benefits in the event of a future emergence of a covered critical injury associated with exposures 14, FIG. 1. Data product 110 may therefore set forth insured benefits for settling asymptomatic claimants in accordance with the final settlement 82 at premiums 120 determined by synthesis of actuarial statistical information and insurance risk information.

Figure 5:
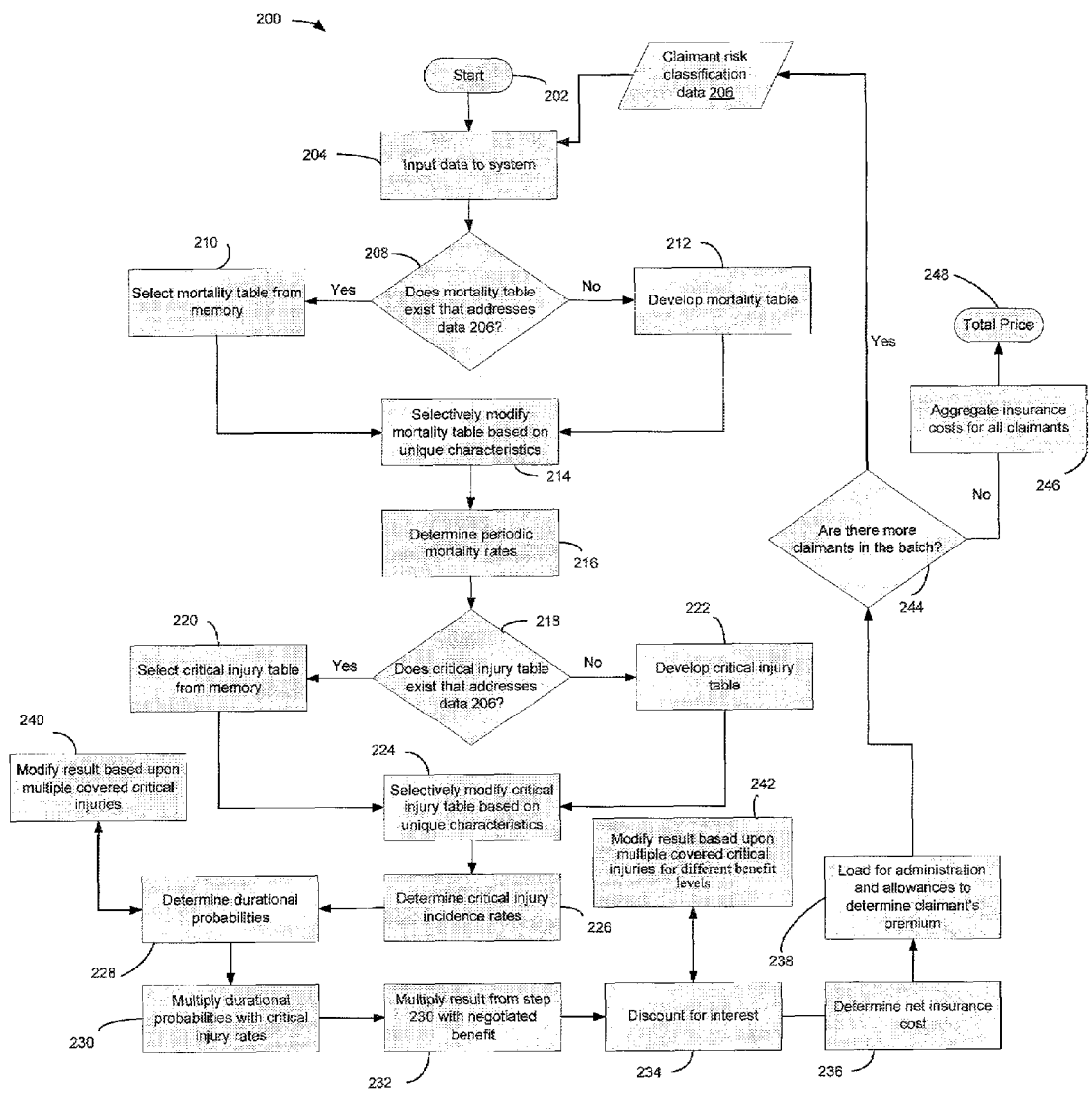
FIG. 5 illustrates, by way of example, a calculation process suitable for use in the process of FIG. 3, or system of FIG. 4, for determining the value of the risk of critical injury emergence associated with exposure to asbestos, in accord with the invention.

FIG. 5 shows one flowchart 200 illustrating, by way of example, for asbestos, a process for determining the cost of providing critical injury insurance for asymptomatic claimants for groups or "batches" of mass tort claims settlements. System 100, FIG. 4, may, for example, process flowchart 200 for each claimant and then determine the sum of the premium costs for all settling claimants included in a batch. The appropriate costs for coverage provided to all settling asymptomatic claimants in the batch constitutes the total cost of insuring each for the risk of later covered critical injury emergence.

Settlement 82, FIG. 3, may generally set forth the terms that specify the covered critical injuries and insured benefits. The insurer, in turn, prices the coverage for settlement use, for example in the case of asbestos in accordance with the flowchart of FIG. 5. With further regard to FIG. 5, flowchart 200 starts at step 202. In step 204, asymptomatic claimant risk classification data 206 are input to system 100 for each claimant. Data 206 may be stored within memory 106 of system 100, FIG. 4; data 206 may, for example, include information such as age, sex, status as smoker or non-smoker, duration of exposure, severity of exposure and other factors that are associated with critical injury emergence.

At decision step 208, a determination is made whether a mortality table exists that addresses data 206; by way of example, step 208 may include a comparison between data 206 input to system 100 and the actuarial statistical information and insurance risk information within memory 104. If a mortality table is available, it is selected in step 210; by way of example, one standard mortality table is the U.S. Population Mortality Table published by the Social Security Administration; other actuarial tables are developed by the Society of Actuaries or other sources, e.g., the Internal Revenue Service and U.S. Census Bureau. If a mortality table is not available, one is developed in step 212; by way of example, step 212 may include synthesizing various existing tables within memory 104.

Step 214 optionally provides for modifying certain demographic risk classification characteristics of the selected or developed mortality table, such as to accommodate unique characteristics like smoking habits and/or expected future mortality improvements; by way of example, step 214 may include modifying actuarial tables within memory 104 through user interface 114 or computer 118. In step 216, mortality rates are developed. By way of example, step 216 may include synthesizing asymptomatic claimant data of memory 106 with actuarial information of memory 104 to perform a "table look-up" to determine mortality based on data 206.

At decision step 218, a determination is made whether a critical injury incidence table exists that addresses data 206; by way of example, step 218 may include a comparison between data 206 input to system 100 and the actuarial statistical information and insurance risk information within memory 104. If a critical injury table is available, it is selected in step 220; by way of example, one standard critical injury table is the SEER population data table for asbestos exposure developed by the Center for Disease Control. If a critical injury table is not available, one is developed in step 222; by way of example, step 222 may include synthesizing various existing critical injury tables within memory 104.

Step 224 optionally provides for modifying the selected or developed critical injury table based on general population data adjustment factors such as, for asbestos, severity of exposure, duration of exposure and date of first exposure; by way of one exemplary operation, step 224 may include modifying actuarial tables within memory 104 through user interface 114 or computer 118.

Step 226 determines, by way of example, critical injury incidence rates by attained age, sex and, for asbestos, smoker status, using actuarial methodology regarding development of single-decrement tables. Step 228 calculates durational probabilities of surviving without emergence of a covered condition from the current date to each future year during which insurance coverage will be provided, utilizing steps 216 and 226 with appropriate modification for double-decrement tables based on actuarial methodology.

Step 230 multiplies the durational probabilities of step 228 with the critical injury rates of step 226 to calculate the durational probability of the emergence of a critical injury in each future year of insurance coverage. In step 232, the result of step 230 is multiplied by the benefit shown in the insurance contract (e.g., as determined and set forth in settlement 82, FIG. 3) payable upon diagnosis of the critical injury.

This product is then discounted, in step 234, for interest from the end of each future insurance year back to the current date, utilizing the level of current capital market rates to select discount interest rates at each duration of insurance coverage. The result from step 234 is summarized in step 236 for all future years to obtain the net insurance cost on a present-value basis.

In step 238, the result from step 236 is added to an amount needed to cover future administration expenses and other allowances, producing the final claimant premium for the single coverage.

In the event that an asymptomatic claimant 28 might later manifest more than one covered critical injury, appropriate modification for changes to risk exposure and decremental inter-relationships is made as indicated by step 240, following actuarial methodology; the modification of 228, 230 restricts benefits to a maximum for all covered critical injuries; it also modifies step 234 for different benefit levels by covered critical injuries, as indicated by step 242. Steps 240, 242 may be further modified for two or more covered critical injuries to reflect the combined insurance cost for all covered critical injuries by adding the modified single-coverage costs 238 together.

Steps 204-242 address a single asymptomatic plaintiff. There are typically many such plaintiffs in any mass tort litigation. At decision step 244, a decision is made whether there are additional settling claimants for inclusion in the current premium calculations; by way of example, decision step 244 may include sequential processing of batched information for additional settling claimants. If there are additional claimants, steps 204-242 are repeated for each additional claimant, as indicated by additional input of asymptomatic claimant risk classification data 206 to system 100. The premiums for all asymptomatic claimants, step 238, are aggregated at step 246, so as to determine a total price 248 to be paid by the potentially responsible party 20, FIG. 1.

Example

Table I sets forth example calculations illustrative of selected steps through process 200. Table I annotates relevant data and data arrays with a numerical number (e.g., "206" or "216") to indicate a relevance of the data or data arrays, within Table I, with the like-numbered steps of process 200. Input to Table I is for example annotated as number 206 and sets forth exemplary claimant data for the calculations within Table I. Certain data and data arrays are for example annotated with numbers 216, 222, 226, 230, 232, 234, 236, 238 in association with steps 216, 222, 226, 230, 232, 234, 236, 238 of process 200.

TABLE I

Premium Calculation Process
206: Asymptomatic Asbestos Claimant Risk Classification Data
Male, Age 62 in 2002, Current Smoker, Former Construction Worker
(started in 1962, worked for 20 years)
Critical Injury Coverage: Lung Cancer ($10,000)

| | Based on Social Security Tables, trended for mortality improvements (1920–1990), projected for future mortality improvements (2002–later), and modified for smoker mortality experience | | Derived from Table 222 | | Based on $10,000 lung cancer benefit and Table 230 Distribution | 6% interest assumed Discounted |
|---|---|---|---|---|---|---|
| Future Attained Age | Smoker Mortality Rates | Critical Injury Table (Lung Cancer) | Lung Cancer Incidence Rates | | of Expected Claims | Expected Claims |
| | 216 | 222 | 226 | 230 | 232 | 234 |
| 62 | 0.03210 | 0.0088151 | 0.015867126 | 1.00000 | 158.671260 | 154.115152 |
| 63 | 0.03492 | 0.0096507 | 0.017371332 | 0.94431 | 164.039274 | 150.310404 |
| 64 | 0.03799 | 0.0105080 | 0.018914400 | 0.90197 | 170.602937 | 147.476167 |
| 65 | 0.04131 | 0.0113789 | 0.020482020 | 0.85811 | 175.758011 | 143.332475 |
| 66 | 0.04492 | 0.0122548 | 0.022058640 | 0.81290 | 179.314692 | 137.955647 |
| 67 | 0.04884 | 0.0131260 | 0.023626800 | 0.76656 | 181.114520 | 131.453154 |
| 68 | 0.05309 | 0.0139825 | 0.025168500 | 0.71935 | 181.048726 | 123.967359 |
| 69 | 0.05770 | 0.0148135 | 0.026664300 | 0.67152 | 179.056271 | 115.663291 |
| 70 | 0.06270 | 0.0156083 | 0.028094940 | 0.62338 | 175.139108 | 106.729206 |
| 71 | 0.06811 | 0.0163560 | 0.029440800 | 0.57525 | 169.358106 | 97.364417 |
| 72 | 0.07397 | 0.0170459 | 0.030682620 | 0.52745 | 161.835604 | 87.773312 |
| 73 | 0.08032 | 0.0176680 | 0.031802400 | 0.48032 | 152.754499 | 78.158562 |
| 74 | 0.08718 | 0.0182129 | 0.032783220 | 0.43421 | 142.348078 | 68.711320 |
| 75 | 0.09459 | 0.0186720 | 0.033609600 | 0.38945 | 130.890983 | 59.604706 |
| 76 | 0.10261 | 0.0190383 | 0.034268940 | 0.34635 | 118.691458 | 50.989930 |
| 77 | 0.11125 | 0.0193059 | 0.034750620 | 0.30524 | 106.071975 | 42.989238 |
| 78 | 0.12058 | 0.0194703 | 0.035046540 | 0.26638 | 93.356119 | 35.694065 |
| 79 | 0.13063 | 0.0195290 | 0.035152200 | 0.23002 | 80.856221 | 29.164920 |
| 80 | 0.14145 | 0.0194809 | 0.035065620 | 0.19636 | 68.855379 | 23.430382 |
| 81 | 0.15308 | 0.0193269 | 0.034788420 | 0.16557 | 57.598459 | 18.490408 |
| 82 | 0.16557 | 0.0190695 | 0.034325100 | 0.13774 | 47.280478 | 14.318965 |
| 83 | 0.17897 | 0.0187128 | 0.033683040 | 0.11294 | 38.041174 | 10.868705 |

TABLE I-continued

Premium Calculation Process
206: Asymptomatic Asbestos Claimant Risk Classification Data
Male, Age 62 in 2002, Current Smoker, Former Construction Worker
(started in 1962, worked for 20 years)
Critical Injury Coverage: Lung Cancer ($10,000)

| Future Attained Age | Based on Social Security Tables, trended for mortality improvements (1920–1990), projected for future mortality improvements (2002–later), and modified for smoker mortality experience | Derived from Table 222 | | Based on $10,000 lung cancer benefit and Table 230 Distribution | 6% interest assumed Discounted |
|---|---|---|---|---|---|
| | Smoker Mortality Rates | Critical Injury Table (Lung Cancer) | Lung Cancer Incidence Rates | of Expected Claims | Expected Claims |
| | 216 | 222 | 226 | 230 | 232 | 234 |
| 84 | 0.19333 | 0.0182626 | 0.032872680 | 0.09115 | 29.962917 | 8.076108 |
| 85 | 0.20868 | 0.0177259 | 0.031906620 | 0.07231 | 23.071149 | 5.866531 |
| 86 | 0.22507 | 0.0171111 | 0.030799980 | 0.05630 | 17.340148 | 4.159672 |
| 87 | 0.24255 | 0.0164275 | 0.029569500 | 0.04295 | 12.700177 | 2.874155 |
| 88 | 0.26113 | 0.0156851 | 0.028233180 | 0.03205 | 9.047817 | 1.931694 |
| 89 | 0.28087 | 0.0148945 | 0.026810100 | 0.02334 | 6.257269 | 1.260299 |
| 90 | 0.30176 | 0.0140666 | 0.025319880 | 0.01655 | 4.191599 | 0.796457 |
| 91 | 0.32384 | 0.0132121 | 0.023781780 | 0.01141 | 2.713191 | 0.486359 |
| 92 | 0.34710 | 0.0123419 | 0.022215420 | 0.00762 | 1.692592 | 0.286235 |
| 93 | 0.37153 | 0.0114661 | 0.020638980 | 0.00492 | 1.014716 | 0.161886 |
| 94 | 0.39710 | 0.0105942 | 0.019069560 | 0.00306 | 0.582761 | 0.087710 |
| 95 | 0.42378 | 0.0097353 | 0.017523504 | 0.00182 | 0.319531 | 0.045370 |
| 96 | 0.45150 | 0.0088971 | 0.016014852 | 0.00104 | 0.166642 | 0.022322 |
| 97 | 0.48019 | 0.0080868 | 0.014556204 | 0.00057 | 0.082326 | 0.010404 |
| 98 | 0.50974 | 0.0073101 | 0.013158198 | 0.00029 | 0.038358 | 0.004573 |
| 99 | 0.54002 | 0.0065720 | 0.011829546 | 0.00014 | 0.016773 | 0.001886 |
| 100 | 0.57088 | 0.0058761 | 0.010576998 | 0.00006 | 0.006848 | 0.000727 |
| 101 | 0.60216 | 0.0052253 | 0.009405468 | 0.00003 | 0.002595 | 0.000260 |
| 102 | 0.63364 | 0.0046212 | 0.008318070 | 0.00001 | 0.000907 | 0.000086 |
| 103 | 0.66511 | 0.0040646 | 0.007316226 | 0.00000 | 0.000291 | 0.000026 |
| 104 | 0.69633 | 0.0035555 | 0.006399918 | 0.00000 | 0.000085 | 0.000007 |
| 105 | 0.72703 | 0.0030932 | 0.005567832 | 0.00000 | 0.000022 | 0.000002 |
| 106 | 0.75696 | 0.0026764 | 0.004817484 | 0.00000 | 0.000005 | 0.000000 |
| 107 | 0.78585 | 0.0023031 | 0.004145508 | 0.00000 | 0.000001 | 0.000000 |
| 108 | 0.81342 | 0.0019710 | 0.003547800 | 0.00000 | 0.000000 | 0.000000 |
| 109 | 0.83944 | 0.0016776 | 0.003019698 | 0.00000 | 0.000000 | 0.000000 |
| 110 | 0.86367 | 0.0014201 | 0.002556162 | 0.00000 | 0.000000 | 0.000000 |
| 111 | 0.88592 | 0.0011956 | 0.002151990 | 0.00000 | 0.000000 | 0.000000 |
| 112 | 0.90606 | 0.0010010 | 0.001801836 | 0.00000 | 0.000000 | 0.000000 |
| 113 | 0.92397 | 0.0008336 | 0.001500413 | 0.00000 | 0.000000 | 0.000000 |
| 114 | 0.93962 | 0.0006903 | 0.001242599 | 0.00000 | 0.000000 | 0.000000 |
| 115 | 0.95303 | 0.0005686 | 0.001023469 | 0.00000 | 0.000000 | 0.000000 |
| 116 | 0.96427 | 0.0004658 | 0.000838381 | 0.00000 | 0.000000 | 0.000000 |
| 117 | 0.97348 | 0.0003795 | 0.000683017 | 0.00000 | 0.000000 | 0.000000 |
| 118 | 0.98083 | 0.0003074 | 0.000553406 | 0.00000 | 0.000000 | 0.000000 |
| 119 | 0.98654 | 0.0002477 | 0.000445945 | 0.00000 | 0.000000 | 0.000000 |
| | | 236: Net Insurance Cost | Summation of 234 | | $1854.63 | |
| | | 238: Final Claimant Premium | 10% load applied | | $2060.71 | |

Certain changes may be made in the above methods and systems without departing from the scope of the invention. It is intended that all matter contained in the above description or shown in the accompanying drawing be interpreted as illustrative and not in a limiting sense. It is also to be understood that the following claims are to cover all generic and specific features of the invention described herein and all statements of the scope of the invention that, as a matter of language, might be said to fall there between.

What is claimed is:

1. A method for determining insurance premiums using a computer system coupled to a database, the computer system configured to perform the method, the insurance premiums payable by a responsible party to an insurer for defined monetary benefits payable to one or more asymptomatic claimants upon future emergence of at least one critical injury, wherein the responsible party, the insurer, and the one or more asymptomatic claimants are different parties, each of the one or more asymptomatic claimants being a party who has been exposed to an injurious condition or substance that increases a likelihood of the future emergence of the at least one critical injury, the method comprising the steps of:

A) receiving predefined critical injury data predefining the at least one critical injury by the responsible party, the responsible party agreeing to be responsible for the future emergence of the at least one predefined critical injury suffered by any of the one or more asymptomatic claimants, the responsible party responsible for exposing each of the one or more asymptomatic claimants to the injurious condition or substance;

B) receiving asymptomatic claimant risk classification data for the one or more asymptomatic claimants, the asymptomatic claimant risk classification data including, for each asymptomatic claimant, a duration of exposure and severity of exposure to the injurious condition or substance;

C) determining a mortality table associated with the at least one predefined critical injury based on the asymptomatic claimant risk classification data;

D) determining mortality rates from the mortality table;

E) determining a critical injury table associated with the at least one predefined critical injury based on the asymptomatic claimant risk classification data;

F) determining critical injury incidence rates from the critical injury table;

G) determining first durational probabilities of surviving without emergence of the predefined critical injury from a present date to each future insurance coverage year end;

H) multiplying the first durational probabilities by the critical injury incidence rates to determine second durational probabilities of predefined critical injury emergence in future insurance coverage years;

I) multiplying the defined monetary benefits by the second durational probabilities to determine expected payments of the defined monetary benefits;

J) discounting the expected payments for interest to determine net insurance cost on a present value basis; and K) generating an insurance product for the responsible party based on the determined net insurance cost, the insurance product provided by the insurer and including the defined monetary benefits payable to the one or more asymptomatic claimants upon future emergence of the at least one predefined critical injury.

2. A method of claim 1, the step of receiving the asymptomatic claimant risk classification data comprising receiving asbestos data selected from the group consisting essentially of age, sex, smoker non-smoker status, duration of exposure, and severity.

3. A method of claim 1, the step of determining a mortality table comprising selecting a standard mortality table.

4. A method of claim 3, further comprising the step of modifying the standard mortality table based on unique characteristics in the data.

5. A method of claim 1, the step of determining a critical injury table comprising selecting a standard critical injury table.

6. A method of claim 1, further comprising the step of modifying the critical injury table based on unique characteristics in the asymptomatic claimant risk classification data.

7. A method of claim 1, further comprising the step of converting the net insurance cost to insurance premiums.

8. A method of claim 7, further comprising the step of loading one or both of fixture administrative costs and risk allowance to the insurance premiums to produce loaded single claimant premiums.

9. A method of claim 8, further comprising repeating steps A) through J) for each of the one or more asymptomatic claimants, wherein the step of receiving asymptomatic claimant risk classification data comprises receiving information for each of the one or more asymptomatic claimants.

10. A method of claim 8, the step of determining first durational probabilities further comprising modifying the single claimant premiums for multiple covered critical injuries.

11. A method of claim 9, further comprising aggregating the loaded single claimant premiums for all of the asymptomatic claimants to determine a total premium price.

12. A method of claim 9, the step of receiving asymptomatic claimant risk classification data comprising processing batched information including data for each of the one or more asymptomatic claimants.

13. A method of claim 12, further comprising sorting through the batched information as a budgetary control procedure to determine whether additional asymptomatic claimants should be processed.

14. A method of claim 1, further comprising utilizing current capital market rates to select discount interest rates at each duration of insurance coverage.

15. A method of claim 1, the step of generating an insurance product for the responsible party further comprising generating an insurance certificate for one or more asymptomatic claimants, the insurance certificate to be exchanged for a full release of the responsible party, wherein the insurance product insures against potential future liabilities of the responsible party arising from the one or more asymptomatic claimants being exposed to the injurious condition or substance.

16. A system for determining insurance premiums payable by a responsible party to an insurer for a monetary benefit payable to one or more asymptomatic claimants upon future emergence of at least one critical injury, wherein the responsible party, the insurer, and the asymptomatic claimants are different parties, each asymptomatic claimant being a party who has been exposed to an injurious condition or substance that increases a likelihood of the future emergence of the at least one critical injury, the system comprising:

a database for storing actuarial statistical information, insurance risk information, and asymptomatic claimant risk classification data; and a computer system coupled to the database, the computer system having a processor, the computer system configured to:

receive data corresponding to at least one predefined critical injury from the responsible party, the responsible party agreeing to be responsible for the future emergence of the at least one predefined critical injury suffered by any of the one or more asymptomatic claimants, the responsible party responsible for exposing each of the one or more asymptomatic claimants to the injurious condition or substance;

receive asymptomatic claimant risk classification data for the one or more asymptomatic claimants including for each asymptomatic claimant a duration of exposure and severity of exposure to the injurious condition or substance;

determine a mortality table associated with the at least one predefined critical injury based on the asymptomatic claimant risk classification data;

determine mortality rates from the mortality table;

determine a critical injury table associated with the at least one predefined critical injury based on the asymptomatic claimant risk classification data;

determine critical injury incidence rates from the critical injury table;

determine first durational probabilities of surviving without emergence of the critical injury from a present date to each future insurance coverage year end;

multiply the first durational probabilities by the critical injury incidence rates to determine second durational probabilities of critical injury emergence in future insurance coverage years;

multiply the defined monetary benefits by the second durational probabilities to determine expected payments of the defined monetary benefits;

discount the expected payments for interest to determine net insurance cost on a present value basis; and generate an insurance product to be offered by the insurer to the responsible party based on the determined net insurance cost, the insurance product including the defined monetary benefits payable to the one or more asymptomatic claimants upon future emergence of the at least one critical injury.

17. A system of claim 16, the computer system further configured to produce an insurance product setting forth critical injury insurance for the monetary benefit.

18. A system of claim 17, the computer system further configured to produce an insurance product comprising an insurance certificate.

19. A system of claim 16, further comprising a network connection for connecting the computer system with a remote computer.

20. A system of claim 19, the remote computer configured to download batched information including the asymptomatic claimant risk classification data for each of the one or more asymptomatic claimants.

21. A system of claim 16, the computer system further configured to modify the mortality table based on unique characteristics of the asymptomatic claimant risk classification data.

22. A system of claim 16, the computer system configured to determine one or more critical injury tables based on the asymptomatic claimant risk classification data.

23. A system of claim 16, the computer system configured to determine critical injury rates using single-decrement tables.

24. A system of claim 16, the computer system configured to determine durational probabilities of surviving without emergence of a critical injury from the present date to each future year end of insurance coverage.

25. A system of claim 16, the computer system configured to multiply durational probabilities with critical injury incidence rates to determine a durational probability of emergence in each future insurance coverage year.

26. A system of claim 25, the computer system configured to multiply the monetary benefit with the durational probabilities.

27. A system of claim 16, further comprising the computer system configured to generate an insurance certificate to be provided to one or more of the asymptomatic claimants in exchange for a full release of the responsible party, wherein the insurance product being offered to the responsible party insures against potential future liabilities of the responsible party arising from the one or more asymptomatic claimants being exposed to the injurious condition or substance.

28. A computer coupled to a database for determining insurance premiums payable by a responsible party to an insurer, the insurance premiums defining monetary benefits payable to asymptomatic claimants upon future emergence of at least one critical injury, wherein the responsible party, the insurer, and the asymptomatic claimants are different parties, each asymptomatic claimant being a party who has been exposed to an injurious condition or substance that increases a likelihood of the future emergence of the at least one critical injury, the computer programmed to:

A) store data corresponding to the at least one critical injury predefined by the responsible party, the responsible party agreeing to be responsible for the future emergence of the at least one predefined critical injury suffered by any of the asymptomatic claimants, the responsible party responsible for exposing each of the asymptomatic claimants to the injurious condition or substance;

B) store asymptomatic claimant risk classification data for each of the asymptomatic claimants including for each asymptomatic claimant a duration of exposure and severity of exposure to the injurious condition or substance;

C) automatically select one or more mortality tables associated with the at least one predefined critical injury based on the asymptomatic claimant risk classification data;

D) determine mortality rates from the mortality tables;

E) automatically select one or more critical injury tables associated with the at least one predefined critical injury based on the asymptomatic claimant risk classification data;

F) determine critical injury incidence rates from the critical injury tables;

G) process, for each of the asymptomatic claimants, first durational probabilities of surviving without emergence of the critical injury from a present date to each future insurance coverage year end;

H) multiply, for each of the asymptomatic claimants, the first durational probabilities by the critical injury incidence rates to determine second durational probabilities of critical injury emergence in future insurance coverage years;

I) multiply, for each of the asymptomatic claimants, the defined monetary benefits by the second durational probabilities to determine expected payments of the defined monetary benefits;

J) discount, for each of the asymptomatic claimants, the expected payments for interest to determine net insurance cost on a present value basis;

K) aggregate the net insurance costs for all asymptomatic claimants to determine a total premium price; and L) generate an offer to provide an insurance product to the responsible party based on the total premium price, the insurance product provided by the insurer and including the defined monetary benefits payable to the asymptomatic claimants upon future emergence of the at least one critical injury.

29. Computer coupled to a database of claim 28, wherein the computer is further programmed to sort through the asymptomatic claimant risk classification data as a budgetary control procedure to determine whether additional claimants should be processed.

30. A computer readable medium that includes computer executable instructions, wherein the instructions, when executed by a computer, perform steps for determining insurance premiums payable by a responsible party, to an insurer, for defined monetary benefits payable to one or more asymptomatic claimants upon future emergence of at least one critical injury, wherein the responsible party, the insurer, and the asymptomatic claimants are different parties, each asymptomatic claimant being a party who has been exposed to an injurious condition or substance that increases a likelihood of the future emergence of the at least one critical injury, the computer executable instructions configured to instruct the computer to:

A) store at least one predefined critical injury predefined by the responsible party, the responsible party agreeing to be responsible for the future emergence of the at least one predefined critical injury suffered by any of the one or more asymptomatic claimants, the responsible party responsible for exposing each of the one or more asymptomatic claimants to the injurious condition or substance;

B) store asymptomatic claimant risk classification data for the one or more asymptomatic claimants including, for each asymptomatic claimant, a duration of exposure and severity of exposure to the asymptomatic claimant the injurious condition or substance;

C) determine a mortality table associated with the at least one predefined critical injury based on the asymptomatic claimant risk classification data;

D) determine mortality rates from the mortality table;

E) determine a critical injury table associated with the at least one predefined critical injury based on the asymptomatic claimant risk classification data;

F) determine critical injury incidence rates from the critical injury table;

G) determine first durational probabilities of surviving without emergence of the critical injury from a present date to each future insurance coverage year end;

H) multiply the first durational probabilities by the critical injury incidence rates to determine second durational probabilities of critical injury emergence in fixture insurance coverage years;

I) multiply the defined monetary benefits by the second durational probabilities to determine expected payments of the defined monetary benefits;

J) discount the expected payments for interest to determine net insurance cost on a present value basis; and K) generate an insurance product to be provided to the responsible party, by the insurer, based on the determined net insurance cost, the insurance product including the defined monetary benefits payable to the one or more asymptomatic claimants upon future emergence of the at least one predefined critical injury.

* * * * *